United States Patent
Lee et al.

(10) Patent No.: US 8,643,500 B2
(45) Date of Patent: Feb. 4, 2014

(54) APPARATUS AND METHOD FOR DIAGNOSING ABNORMALITY IN CELL BALANCING CIRCUIT

(75) Inventors: Sang-Hoon Lee, Daejeon (KR); Dal-Hoon Lee, Daejeon (KR); Jee-Ho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 241 days.

(21) Appl. No.: 13/195,633

(22) Filed: Aug. 1, 2011

(65) Prior Publication Data

US 2011/0285539 A1 Nov. 24, 2011

Related U.S. Application Data

(63) Continuation of application No. PCT/KR2010/005308, filed on Aug. 12, 2010.

(30) Foreign Application Priority Data

Feb. 22, 2010 (KR) ........................ 10-2010-0015519

(51) Int. Cl.
*G08B 21/00* (2006.01)
*H02J 7/00* (2006.01)

(52) U.S. Cl.
USPC ............... 340/636.1; 340/636.2; 320/112; 320/116; 320/117; 320/118; 320/119; 320/128; 320/129; 320/137; 320/138

(58) Field of Classification Search
None
See application file for complete search history.

(56) References Cited

U.S. PATENT DOCUMENTS

| | | | | |
|---|---|---|---|---|
| 6,297,618 | B2* | 10/2001 | Emori et al. | 320/132 |
| 6,803,766 | B2* | 10/2004 | Kobayashi et al. | 324/434 |
| 8,288,991 | B2* | 10/2012 | Sardat et al. | 320/118 |
| 2007/0290674 | A1 | 12/2007 | Bolz | |
| 2008/0018300 | A1 | 1/2008 | Zaag et al. | |
| 2008/0218176 | A1* | 9/2008 | Ohashi et al. | 324/548 |
| 2009/0128158 | A1 | 5/2009 | Kawai | |
| 2009/0309545 | A1 | 12/2009 | Kunimitsu | |
| 2010/0085009 | A1 | 4/2010 | Kang et al. | |
| 2013/0049673 | A1* | 2/2013 | Agarwal et al. | 320/101 |
| 2013/0221926 | A1* | 8/2013 | Furtner | 320/129 |

FOREIGN PATENT DOCUMENTS

| | | |
|---|---|---|
| JP | 06/038360 A | 2/1994 |
| JP | 2007-207699 A | 3/2007 |
| JP | 2007-85847 A | 4/2007 |
| JP | 2009-159769 A | 7/2009 |
| KR | 10-2009-0031449 A | 3/2009 |
| KR | 10-2010-0019256 A | 2/2010 |
| KR | 10-2010-0023364 A | 3/2010 |
| WO | WO 2005/109600 A1 | 11/2005 |
| WO | WO 2009/014407 A2 | 1/2009 |
| WO | WO 2009/158367 A2 | 12/2009 |

* cited by examiner

*Primary Examiner* — Julie Lieu
(74) *Attorney, Agent, or Firm* — Birch, Stewart, Kolasch & Birch, LLP

(57) ABSTRACT

Provided are an apparatus and a method for diagnosing an abnormality in a cell balancing circuit. The apparatus may include a floating capacitor charged with voltage of a battery cell, a cell balancing circuit for discharging the floating capacitor, a voltage measuring unit for measuring the battery cell voltage of the charged floating capacitor and a residual voltage of the discharged floating capacitor, and a control unit for determining an abnormality in the cell balancing circuit based on the residual voltage of the discharged floating capacitor.

19 Claims, 2 Drawing Sheets

APPARATUS AND METHOD FOR DIAGNOSING ABNORMALITY IN CELL BALANCING CIRCUIT

CROSS-REFERENCE TO RELATED APPLICATION

This application is a continuation of International Application No. PCT/KR2010/005308 filed on Aug. 12, 2010, which claims priority to Korean Patent Application No. 10-2010-0015519 filed in Republic of Korea on Feb. 22, 2010, the entire contents of which are incorporated herein by reference.

TECHNICAL FIELD

The present invention relates to an apparatus and a method for diagnosing an abnormality in a cell balancing circuit, and more particularly, to an apparatus and a method for diagnosing an abnormality in a cell balancing circuit using a floating capacitor used in cell voltage measurement.

BACKGROUND ART

Recently, with exhaustion of fossil fuels and concern about environmental pollution, there is an increasing interest in electric vehicles or hybrid vehicles using electrical energy, but not using fossil energy.

To run the electric vehicles or hybrid vehicles, a driving motor requiring a high output should be operated. For this purpose, batteries for the electric vehicles or hybrid vehicles use, as a power source, electricity outputted from a battery pack including a plurality of battery cells connected in series.

A plurality of battery cells included in the battery pack need to individually maintain a uniform voltage for ensuring stability, a long life span, and a high output.

A method for uniformly balancing the discharging voltages of battery cells includes increasing the voltage of a battery cell having a relatively lower voltage by supplying a charging current, decreasing the voltage of a battery cell having a relatively higher voltage by discharging the corresponding battery cell, discharging a battery cell having a voltage higher than a target voltage and charging a battery cell having a voltage lower than the target voltage, and the like.

These cell balancing methods are implemented by a cell balancing circuit connected to each battery cell. The cell balancing circuit includes a switching circuit for controlling the start and end of a cell balancing operation, and a discharging resistor for discharging a battery cell.

However, when an abnormality occurs during a cell balancing operation using the cell balancing circuit, for example, when overcurrent instantaneously flows in the cell balancing circuit, or when overvoltage higher than an operating voltage is applied to a switching circuit, or when overheat is generated through a discharging resistor, a component included in the cell balancing circuit is short-circuited or open-circuited, and consequently, the cell balancing circuit is not operated normally.

When the cell balancing circuit abnormally operates due to this problem, the voltage of a battery cell connected to the corresponding cell balancing circuit excessively increases or decreases, and as a result, severe results may be produced, for example, a battery pack may explode or the operation of a load connected to the battery pack may suddenly stop.

To overcome this drawback, there is a need of a separate diagnosis circuit connected to a cell balancing circuit for diagnosing an abnormality in the cell balancing circuit.

For example, Japanese Patent Publication No. 2007-085847 (conventional art) discloses an apparatus for detecting an abnormality in a cell balancing circuit, in which a cell balancing circuit including a field effect transistor (FET) and a discharging resistor, and a resistor interposed between the source and the drain of the FET are installed at each battery cell, a difference in voltage between the source and the drain is measured through the resistor using two comparators applied with different levels of reference power sources, and an abnormality of the cell balancing circuit is determined based on the measured voltage level (high, low).

However, the conventional art needs a separate circuit configuration, that is, the diagnosis circuit for detecting an abnormality in the cell balancing circuit, and the additional two comparators for each diagnosis circuit, and thus, has a disadvantage of increased manufacturing cost of the apparatus for detecting an abnormality in a cell balancing circuit.

DISCLOSURE

Technical Problem

The present invention is designed to solve the problems of the conventional art, and therefore, it is an object of the invention to provide an apparatus and method for diagnosing an abnormality in a cell balancing circuit, which may diagnose an abnormality in a cell balancing circuit in a simple way using a floating capacitor used in cell voltage measurement, without an additional circuit.

Technical Solution

In order to achieve the object, an apparatus for diagnosing an abnormality in a cell balancing circuit according to an aspect of the present invention may include a floating capacitor charged with voltage of a battery cell, a cell balancing circuit for discharging the floating capacitor, a voltage measuring unit for measuring the battery cell voltage of the charged floating capacitor and a residual voltage of the discharged floating capacitor, and a control unit for determining an abnormality in the cell balancing circuit based on the residual voltage of the discharged floating capacitor.

The apparatus for diagnosing an abnormality in a cell balancing circuit according to the present invention may further include a first switch for establishing a connection between the floating capacitor and the battery cell or releasing the connection, and a second switch for establishing a connection between the floating capacitor and the voltage measuring unit or releasing the connection.

Preferably, the control unit may charge the floating capacitor with the voltage of the battery cell by turning off the second switch and turning on the first switch, and the control unit may apply the battery cell voltage of the charged floating capacitor or the residual voltage of the discharged floating capacitor to the voltage measuring unit by turning off the first switch and turning on the second switch.

According to the present invention, the cell balancing circuit may further include a discharge resistor connected to the floating capacitor at each terminal for discharging the floating capacitor, and a third switch for establishing a connection between the floating capacitor and the discharge resistor or releasing the connection, and the control unit may control the third switch to discharge the charged floating capacitor.

Preferably, the battery cell may be plural, and the floating capacitor, the first and second switches, and the cell balancing circuit may be provided at each battery cell.

Preferably, the control unit may simultaneously or sequentially turn on the first switches respectively corresponding to the battery cells, to charge the corresponding floating capacitors with the voltages of the battery cells.

Preferably, the control unit may simultaneously or sequentially turn on the second switches respectively corresponding to the battery cells, to apply the battery cell voltages of the charged floating capacitors or the residual voltages of the discharged floating capacitors to the voltage measuring unit.

Preferably, the control unit may simultaneously or sequentially turn on the third switches included in the cell balancing circuits respectively corresponding to the battery cells, to discharge the charged floating capacitors.

Preferably, the control unit may further include a switch control module for controlling the operation of the first to third switches, an A/D conversion module for converting an analog voltage signal outputted from the voltage measuring unit into a digital voltage signal, and a central processing module for receiving the digital voltage signal from the A/D conversion module and determining an abnormality in the cell balancing circuit based on the residual voltage of the discharged floating capacitor.

According to an aspect of the present invention, the control unit may determine that there is an abnormality in the cell balancing circuit when the residual voltage of the discharged floating capacitor exceeds a preset reference voltage.

According to another aspect of the present invention, the control unit may determine that there is an abnormality in the cell balancing circuit when a voltage difference between the battery cell voltage of the charged floating capacitor and the residual voltage of the discharged floating capacitor is less than a preset reference voltage.

Optionally, the control unit may further include an abnormality alarm for visually or audibly outputting an abnormality in the cell balancing circuit. In this case, when there is an abnormality in the cell balancing circuit, the control unit may control the abnormality alarm to visually or audibly inform the abnormality in the cell balancing circuit through.

In order to achieve the object, an apparatus for diagnosing an abnormality in a cell balancing circuit according to another aspect of the present invention may include a floating capacitor charged with voltage of a battery cell, a cell balancing circuit connected to the battery cell for balancing the voltage of the battery cell and discharging the floating capacitor, a voltage measuring unit for measuring a residual voltage of the discharged floating capacitor, and a control unit for determining an abnormality in the cell balancing circuit based on the residual voltage of the discharged floating capacitor.

According to an aspect of the present invention, the control unit may determine that there is an abnormality in the cell balancing circuit when the residual voltage of the discharged floating capacitor exceeds a preset reference voltage.

According to another aspect of the present invention, the voltage measuring unit may further measure the battery cell voltage of the charged floating capacitor, and the control unit may determine that there is an abnormality in the cell balancing circuit when a voltage difference between the battery cell voltage of the charged floating capacitor and the residual voltage of the discharged floating capacitor is less than a preset reference voltage.

The object of the present invention may be achieved by a battery management system, a battery operating system, or a battery pack comprising the above-described apparatus for diagnosing an abnormality in a cell balancing circuit.

In order to achieve the object, a method for diagnosing an abnormality in a cell balancing circuit according to the present invention may include charging a floating capacitor with voltage of a battery cell, measuring the battery cell voltage of the charged floating capacitor through a voltage measuring unit, discharging the floating capacitor using a cell balancing circuit, measuring a residual voltage of the discharged floating capacitor through the voltage measuring unit, and determining an abnormality in the cell balancing circuit based on the residual voltage of the discharged floating capacitor.

Effect of the Invention

According to the present invention, an abnormality in a cell balancing circuit may be simply diagnosed without an additional circuit, thereby preventing a problem that may occur due to the abnormality in the cell balancing circuit. Also, elimination of the need for an additional circuit may contribute to cost savings.

DESCRIPTION OF DRAWINGS

These and other features, aspects, and advantages of preferred embodiments of the present invention will be more fully described in the following detailed description, taken accompanying drawings.

MODE FOR INVENTION

Hereinafter, the present invention will be described in detail with reference to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
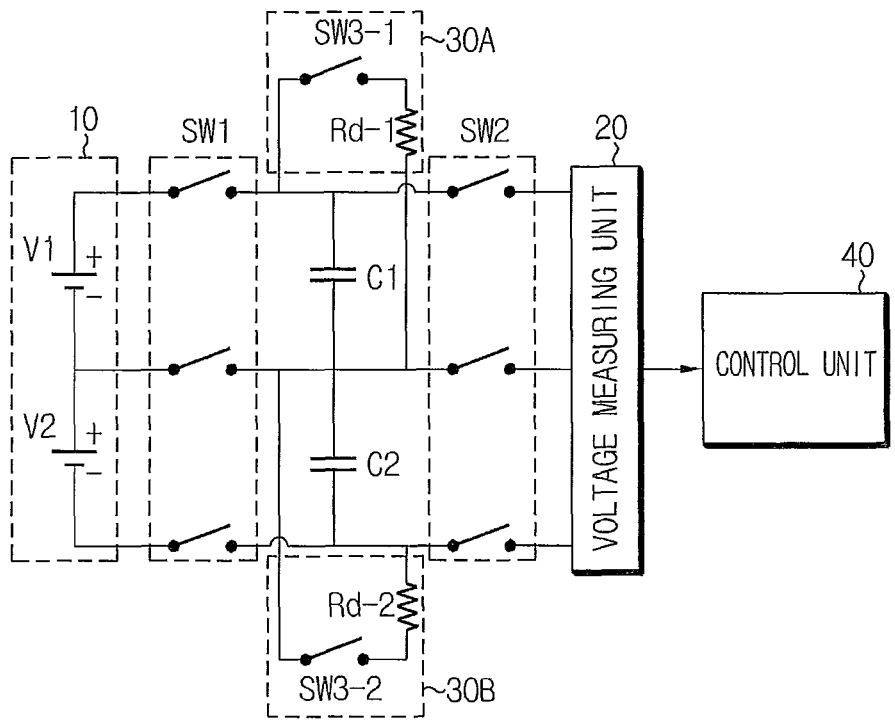
FIG. 1 is a circuit diagram of an apparatus for diagnosing an abnormality in a cell balancing circuit according to a preferred embodiment of the present invention.

FIG. 1 is a circuit diagram of an apparatus for diagnosing an abnormality in a cell balancing circuit according to a preferred embodiment of the present invention. Although FIG. 1 shows two battery cells, the present invention is not limited to a specific number of battery cells.

Referring to FIG. 1, the apparatus for diagnosing an abnormality in a cell balancing circuit according to the present invention may include floating capacitors C1 and C2 charged with the voltages of a plurality of battery cells V1 and V2 included in a battery pack 10, a voltage measuring unit 20 for measuring the charge voltages of the floating capacitors C1 and C2 charged with the voltages of the battery cells V1 and V2 and the residual voltages of the floating capacitors C1 and C2 after discharge, cell balancing circuits 30A and 30B for discharging the charged floating capacitors C1 and C2, and a control unit 40 for determining an abnormality in the cell balancing circuits 30A and 30B based on the residual voltages of the discharged floating capacitors C1 and C2.

The battery cells V1 and V2 may be connected to voltage measuring lines at each terminal. The floating capacitors C1 and C2 may be located between the voltage measuring lines, and may be connected to the battery cells V1 and V2 in parallel and charged with the voltages of the battery cells V1 and V2. The voltage measuring unit 20 may measure the charge voltages of the floating capacitors C1 and C2 respectively corresponding to the battery cells V1 and V2 through the voltage measuring lines.

A first switch SW1 may be installed on the voltage measuring line at the side of the battery cells V1 and V2 relative to the floating capacitors C1 and C2 to establish a connection between the battery cells V1 and V2 and the floating capacitors C1 and C2 or to release the connection. A second switch SW2 may be installed on the voltage measuring line at the side of the voltage measuring unit 20 relative to the floating capacitors C1 and C2 to establish a connection between the floating capacitors C1 and C2 and the voltage measuring unit 20 or to release the connection.

The first switch SW1 and the second switch SW2 may convert into a charge mode or a measurement mode. Also, the first switch SW1 and the second switch SW2 may convert into a discharge mode.

In this instance, in the charge mode, the floating capacitors C1 and C2 may be charged with the voltages of the battery cells V1 and V2, respectively. In the measurement mode, the charge voltage of each of the floating capacitors C1 and C2 may be measured. In the discharge mode, the battery cells V1 and V2 and the voltage measuring unit 20 may be electrically isolated from the floating capacitors C1 and C2 to discharge the floating capacitors C1 and C2.

The first switch SW1 may connect the floating capacitors C1 and C2 to the voltage measuring line at the side of the battery cells V1 and V2 in a charge mode. Also, the first switch SW1 may release a connection between the floating capacitors C1 and C2 and the voltage measuring line at the side of the battery cells V1 and V2 in a measurement mode and a discharge mode.

The second switch SW2 may connect the floating capacitors C1 and C2 to the voltage measuring line at the side of the voltage measuring unit 20 in a charge mode. Also, the second switch SW2 may release a connection between the floating capacitors C1 and C2 and the voltage measuring line at the side of the voltage measuring unit 20 in a measurement mode and a discharge mode.

The cell balancing circuits 30A and 30B may be a protection circuit of the battery pack 10 for balancing the cell voltages of the battery cells V1 and V2 to a predetermined level under the control of the control unit 40.

In addition to a function for balancing the cell voltages of the battery cells V1 and V2 to a predetermined level, the cell balancing circuits 30A and 30B may perform a function for discharging the floating capacitors C1 and C2 for abnormality diagnosis.

The cell balancing circuits 30A and 30B may include discharge resistors Rd-1 and Rd-2 connected to the floating capacitors C1 and C2 at each terminal for discharging the floating capacitors C1 and C2, and third switches SW3-1 and SW3-2 for connecting the floating capacitors C1 and C2 to the discharge resistors Rd-1 and Rd-2, respectively.

To determine an abnormality in the cell balancing circuits 30A and 30B, the control unit 40 may convert the first and second switches SW1 and SW2 into a charge mode. That is, the control unit 40 may turn on the first switch SW1 and turn off the second switch SW2. Then, the battery cells V1 and V2 may be connected at each terminal to the floating capacitors C1 and C2, which may be charged with the voltages of the battery cells V1 and V2, respectively. In this instance, the control unit 40 may simultaneously or sequentially convert the first switch SW1 and the second switch SW2 into a charge mode. That is, the control unit 40 may simultaneously or sequentially turn on the first switch SW1, and may simultaneously or sequentially turn off the second switch SW2. Here, the word 'sequentially' means controlling the turn-on or turn-off of the first and second switches SW1 and SW2 with a time interval. Hereinafter, the word is applied with the same concept.

Next, the control unit 40 may convert the first and second switches SW1 and SW2 into a measurement mode. That is, the control unit 40 may turn off the first switch SW1 and may turn on the second switch SW2. The voltage of the floating capacitors C1 and C2 charged with the cell voltages of the battery cells V1 and V2 may be applied to the voltage measuring unit 20, and the voltage measuring unit 20 may measure the cell voltages of the battery cells V1 and V2 and may output the measurement results to the control unit 40. In this instance, the control unit 40 may simultaneously or sequentially turn off the first switch SW1, and may simultaneously or sequentially turn on the second switch SW2.

Next, the control unit 40 may convert the first and second switches SW1 and SW2 into a discharge mode. That is, the control unit 40 may simultaneously or sequentially turn off the first and second switches SW1 and SW2. Also, the control unit 40 may simultaneously or sequentially operate the cell balancing circuits 30A and 30B to discharge the floating capacitors C1 and C2 for a predetermined time. That is, the control unit 40 may simultaneously or sequentially turn on the third switches SW3-1 and SW3-2 of the cell balancing circuits 30A and 30B to connect the floating capacitors C1 and C2 to the discharge resistors Rd-1 and Rd-2 at each terminal, through which the charged floating capacitors C1 and C2 may be discharged for a predetermined time.

Next, the control unit 40 may convert the first and second switches SW1 and SW2 into a measurement mode again. That is, the control unit 40 may simultaneously or sequentially turn on the second switch SW2 while the first switch SW1 is turned off, to measure the residual voltages of the floating capacitors C1 and C2 using the voltage measuring unit 20. Also, the control unit 40 may determine an abnormality in the cell balancing circuits 30A and 3013 based on the measured residual voltages of the floating capacitors C1 and C2.

Figure 2:
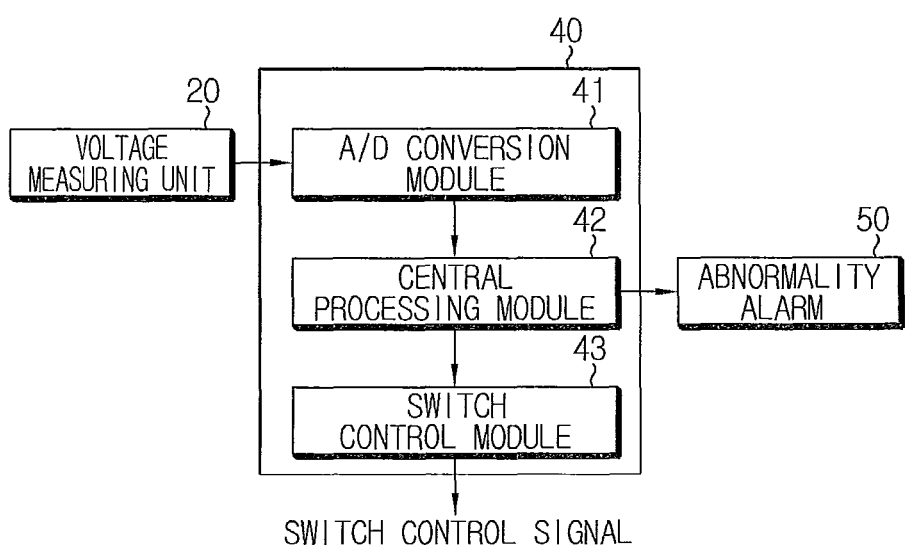
FIG. 2 is a block diagram illustrating a structure of a control unit according to a preferred embodiment of the present invention.

FIG. 2 is a block diagram illustrating a structure of the control unit 40 according to a preferred embodiment of the present invention.

Referring to FIG. 2, the control unit 40 may include an analog/digital (A/D) conversion module 41, a central processing module 42, and a switch control module 43.

The A/D conversion module 41 may convert an analog voltage signal outputted from the voltage measuring unit 20 into a digital voltage signal, and may output the digital voltage signal to the central processing module 42. The analog voltage signal may include a signal corresponding to the cell voltage of each of the battery cells V1 and V2, and a signal corresponding to the residual voltage of each of the floating capacitors C1 and C2 discharged by the cell balancing circuits 30A and 30B.

The central processing module 42 may receive the digital voltage signal from the A/D conversion module 41, and may determine an abnormality in the cell balancing circuits 30A and 30B. That is, the central processing module 42 may determine an abnormality in the cell balancing circuits 30A and 30B based on the residual voltages of the discharged floating capacitors C1 and C2.

The switch control module 43 may control the turn-on or turn-off of the first and second switches SW1 and SW2 and the third switches SW3-1 and SW3-2 included in the cell balancing circuits 30A and 30B.

Hereinafter, a function of each module of the control unit 40 is described in more detail with regard to an abnormality diagnosis process in the cell balancing circuit 30A corresponding to the battery cell V1.

The central processing module 42 may control the switch control module 43 to turn on the first switch SW1 and to turn off the second switch SW2. The battery cell V1 may be connected at each terminal to the floating capacitor C1, which may be charged with the cell voltage of the battery cell V1. Next, the central processing module 42 may control the switch control module 43 to turn off the first switch SW1 to release the connection between the floating capacitor C1 and the battery cell V1, and to turn on the second switch SW2 to connect the floating capacitor C1 to the voltage measuring unit 20 at each terminal. The voltage measuring unit 20 may measure the charge voltage of the floating capacitor C1 and may apply an analog voltage signal corresponding to the cell voltage to the A/D conversion module 41. The A/D conversion module 41 may convert the analog voltage signal outputted from the voltage measuring unit 20 into a digital voltage signal and may input the digital voltage signal into the central processing module 42. The central processing module 42 may store the inputted digital voltage signal in a memory (not shown).

Next, the central processing module 42 may control the switch control module 43 to turn off both the first switch SW1 and the second switch SW2 and to turn on the third switch SW3-1 included in the cell balancing circuit 30A for a predetermined time. The floating capacitor C1 may be connected at each terminal to the discharge resistor Rd-1 included in the cell balancing circuit 30A, so that the floating capacitor C1 may be discharged for a predetermined time.

Next, the central processing module 42 may control the switch control module 43 to turn off the third switch SW3-1, and to turn on the second switch SW2 while the first switch SW1 is turned off, to connect the voltage measuring unit 20 to the floating capacitor C1. The voltage measuring unit 20 may measure the residual voltage of the discharged floating capacitor C1 and may output an analog voltage signal to the A/D conversion module 41. The A/D conversion module 41 may convert the analog voltage signal outputted from the voltage measuring unit 20 into a digital voltage signal and may input the digital voltage signal into the central processing module 42. The central processing module 42 may store the inputted digital voltage signal in a memory (not shown).

Next, the central processing module 42 may compare the residual voltage of the discharged floating capacitor C1 with a preset reference voltage, and when the residual voltage exceeds the reference voltage, the central processing module 42 may determine there is an abnormality in the cell balancing circuit 30A. Here, the reference voltage value may be preferably set as a value close to 0, taking into consideration that the floating capacitor C1 is not completely discharged when there is an abnormality in the cell balancing circuit 30A. The abnormality in the cell balancing circuit 30A may be mainly caused by a short circuit in the third switch SW3-1 or the discharge resistor Rd-1, however the present invention is not be limited in this regard.

Alternatively, the central processing module 42 may compare the cell voltage of the battery cell V1 with the residual voltage of the discharged floating capacitor C1, and when a voltage difference therebetween is less than a preset reference voltage, the central processing module 42 may determine there is an abnormality in the cell balancing circuit 30A. Here, the reference voltage value may be preferably set as a value close to the cell voltage level of the battery cell V1, taking into consideration that the floating capacitor C1 is not discharged when there is an abnormality in the cell balancing circuit 30A.

The operation of the control unit 40 may be also substantially equally applied to diagnosis of an abnormality in the cell balancing circuit 30B. Also, it is obvious to an ordinary person skilled in the art that diagnosis of an abnormality in the cell balancing circuits 30A and 30B may be simultaneously or sequentially made on both or each of the cell balancing circuits.

Optionally, the apparatus for diagnosing an abnormality in a cell balancing circuit according to the present invention may further include an abnormality alarm 50. In this case, when an abnormality occurs in the cell balancing circuits 30A and 30B, the control unit 40 may control the abnormality alarm 50 to inform the abnormality. That is, when the central processing module 42 of the control unit 40 determines there is an abnormality in the cell balancing circuits 30A and 30B, the central processing module 42 may control the abnormality alarm 50 to visually or audibly inform the abnormality by transmitting an abnormality alarm signal to the abnormality alarm 50.

The abnormality alarm 50 may include a liquid emitting display (LED), a liquid crystal display (LCD), an alarm, or combinations thereof. In this instance, when the abnormality alarm signal is inputted, the abnormality alarm 50 may flash an LED or output an alarm message on an LCD. The abnormality alarm 50 may generate an alarm buzz to inform the abnormality in the cell balancing circuits 30A and 30B to a user. The exemplary LED, LCD, and alarm are just an example of the abnormality alarm 50, and it is obvious to an ordinary person skilled in the art that various types of modified visual or audio alarms may be used in the abnormality alarm 50.

It is also obvious to an ordinary person skilled in the art that the diagnosis of an abnormality in a cell balancing circuit as described above may be repeatedly performed at a predetermined interval, and may be performed in response to a user's diagnosis command or a diagnosis command automatically generated by a control algorithm of the central processing module 42.

Also, the control unit 40 may be configured as a microprocessor to execute a program code for implementing a method for diagnosing an abnormality in a cell balancing circuit, or as an application-specific integrated circuit (ASIC) with a logic circuit for implementing a control stream of a method for diagnosing an abnormality in a cell balancing circuit, however the present invention is not limited in this regard.

The above-described apparatus for diagnosing an abnormality in a cell balancing circuit according to the present invention may be used in association with a battery operating system that is provided with a power source from a battery pack.

As an example, the present invention may be connected to a variety of electronic appliances provided with an operating voltage from batteries, such as notebook computers, mobile phones, personal portable multimedia players, and the like.

As another example, the present invention may be used in association with a various kinds of power equipment such as fossil fuel vehicles, electric vehicles, hybrid vehicles, electric bicycles, and the like.

Also, the present invention may be included in a battery management system (BMS) for controlling charge/discharge of a battery pack and protecting a battery pack from overcharge, over-discharge, and the like.

Further, the apparatus for diagnosing an abnormality in a cell balancing circuit according to the present invention may be included in a battery pack.

Figure 3:
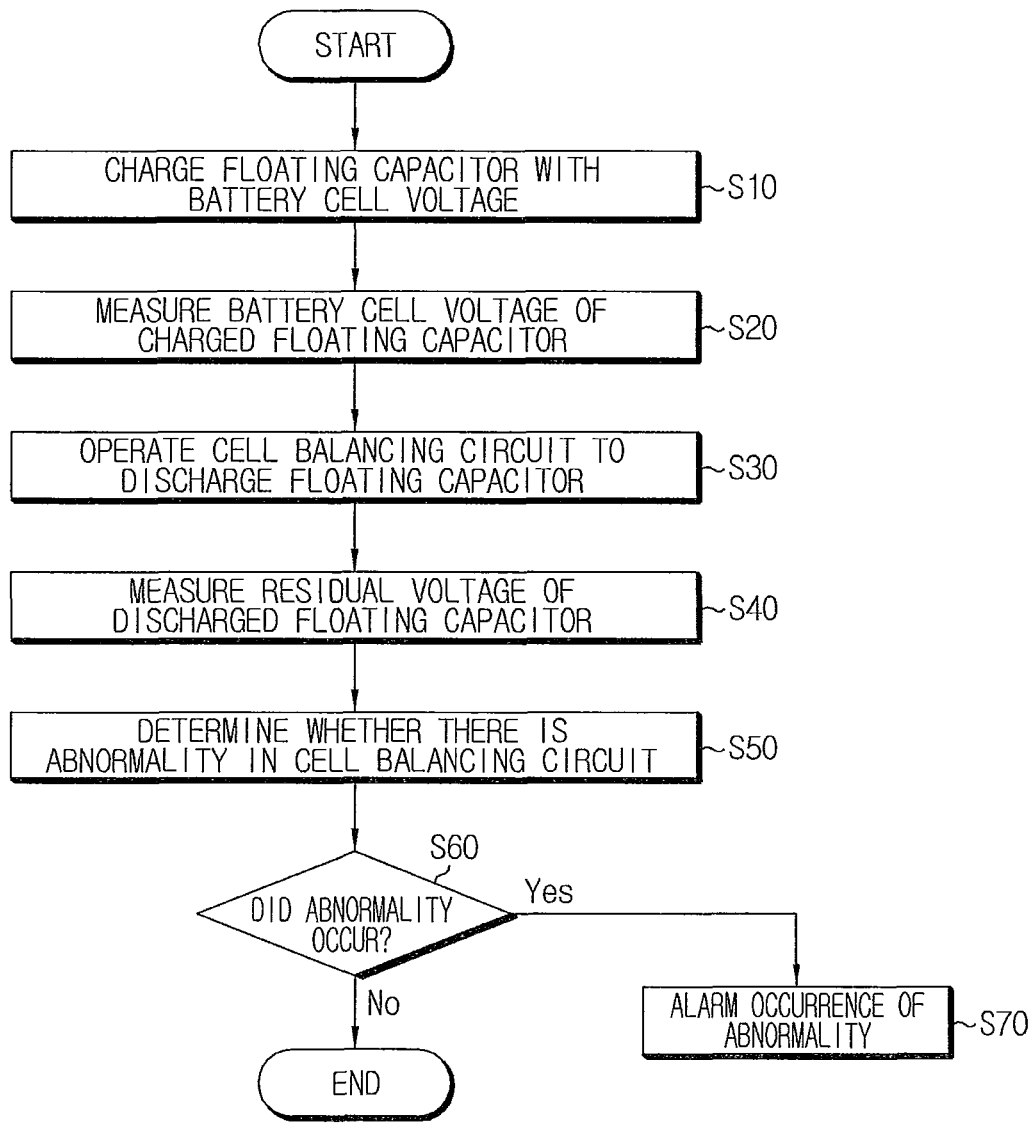
FIG. 3 is a flowchart illustrating a method for diagnosing an abnormality in a cell balancing circuit according to a preferred embodiment of the present invention.

FIG. 3 is a flowchart illustrating a method for diagnosing an abnormality in a cell balancing circuit according to a preferred embodiment of the present invention.

First, in step S10, the control unit 40 may turn on the first switch SW1 and turn off the second switch SW2 to charge the floating capacitors C1 and C2 with the cell voltages of the battery cells V1 and V2, respectively.

In step S20, the control unit 40 may turn off the first switch SW1 and turn on the second switch SW2 to connect the floating capacitors C1 and C2 to the voltage measuring unit 20, and may measure the charge voltages of the floating capacitors C1 and C2 through the voltage measuring unit 20. Here, the measured voltage value corresponds to the cell voltage of each of the battery cells V1 and V2.

In step S30, the control unit 40 may turn off the first switch SW1 and the second switch SW2 and turn on the third switches SW3-1 and SW3-2 to connect the floating capacitors C1 and C2 to the cell balancing circuits 30A and 30B at each terminal, respectively, so that the floating capacitors C1 and C2 may be discharged for a predetermined time.

In step S40, the control unit 40 may turn off the third switches SW3-1 and SW3-2 and turn on the second switch SW2 while the first switch SW 1 is turned off, to connect the discharged floating capacitors C1 and C2 to the voltage measuring unit 20 at each terminal, and may measure the residual voltages of the discharged floating capacitors C1 and C2 through the voltage measuring unit 20.

In step S50, when the residual voltage of each of the discharged floating capacitors C1 and C2 exceeds a preset reference voltage, the control unit 40 may determine that there is an abnormality in the corresponding cell balancing circuit 30A or 30B.

Alternatively, the control unit 40 may compare the cell voltages of the battery cells V1 and V2 with the residual voltages of the discharged floating capacitors C1 and C2, respectively, and when a voltage difference therebetween is less than a preset reference voltage, the control unit 40 may determine that there is an abnormality in the corresponding cell balancing circuit 30A or 30B.

In step S60, the control unit 40 may proceed with an alternate process based on the determination result. When it is determined there is no abnormality in the cell balancing circuits 30A and 30B, the process may be terminated. When it is determined there is an abnormality in the cell balancing circuits 30A and 30B, the step S70 may be performed to visually or audibly inform the abnormality in the cell balancing circuits 30A and 30B to a user through the abnormality alarm 50.

It is obvious to an ordinary person skilled in the art that the steps S10 to S70 may be repeatedly performed at a predetermined interval, and may be performed in response to a user's diagnosis command or a diagnosis command automatically generated by a control algorithm of the control unit 40, in order to diagnose an abnormality in the cell balancing circuits 30A and 30B respectively corresponding to the battery cells V1 and V2.

Hereinafter, the preferred embodiments of the present invention are described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for diagnosing an abnormality in a cell balancing circuit, the apparatus comprising:
    a floating capacitor charged with voltage of a battery cell;
    a cell balancing circuit for discharging the floating capacitor;
    a voltage measuring unit for measuring the battery cell voltage of the charged floating capacitor and a residual voltage of the discharged floating capacitor; and
    a control unit for determining an abnormality in the cell balancing circuit based on the residual voltage of the discharged floating capacitor.

2. The apparatus for diagnosing an abnormality in a cell balancing circuit according to claim 1, further comprising:
    a first switch for establishing a connection between the floating capacitor and the battery cell or for releasing the connection; and
    a second switch for establishing a connection between the floating capacitor and the voltage measuring unit or for releasing the connection.

3. The apparatus for diagnosing an abnormality in a cell balancing circuit according to claim 2,
    wherein the control unit charges the floating capacitor with the voltage of the battery cell by turning on the first switch and turning off the second switch, and
    wherein the control unit applies the battery cell voltage of the charged floating capacitor or the residual voltage of the discharged floating capacitor to the voltage measuring unit by turning off the first switch and turning on the second switch.

4. The apparatus for diagnosing an abnormality in a cell balancing circuit according to claim 1,
    wherein the cell balancing circuit further includes:
    a discharge resistor connected to the floating capacitor at each terminal for discharging the floating capacitor; and
    a third switch for establishing a connection between the floating capacitor and the discharge resistor or for releasing the connection, and
    wherein the control unit controls the third switch to discharge the floating capacitor.

5. The apparatus for diagnosing an abnormality in a cell balancing circuit according to claim 2,
    wherein the battery cell is plural, and
    wherein the floating capacitor, the first and second switches, and the cell balancing circuit are provided at each battery cell.

6. The apparatus for diagnosing an abnormality in a cell balancing circuit according to claim 5,
    wherein the control unit simultaneously or sequentially turns on the first switches respectively corresponding to the battery cells, to charge the corresponding floating capacitors with the voltages of the battery cells.

7. The apparatus for diagnosing an abnormality in a cell balancing circuit according to claim 5,
    wherein the control unit simultaneously or sequentially turns on the second switches respectively corresponding to the battery cells, to apply the battery cell voltages of the charged floating capacitors or the residual voltages of the discharged floating capacitors to the voltage measuring unit.

8. The apparatus for diagnosing an abnormality in a cell balancing circuit according to claim 5,
    wherein the control unit simultaneously or sequentially turns on the third switches included in the cell balancing circuits respectively corresponding to the battery cells, to discharge the charged floating capacitors.

9. The apparatus for diagnosing an abnormality in a cell balancing circuit according to claim 2,
wherein the control unit further includes:
a switch control module for controlling the operation of the first to third switches;
an A/D conversion module for converting an analog voltage signal outputted from the voltage measuring unit into a digital voltage signal; and
a central processing module for receiving the digital voltage signal from the A/D conversion module and determining an abnormality in the cell balancing circuit based on the residual voltage of the discharged floating capacitor.

10. The apparatus for diagnosing an abnormality in a cell balancing circuit according to claim 1,
wherein the control unit further includes an abnormality alarm for visually or audibly outputting an abnormality in the cell balancing circuit, and
wherein the control unit controls the abnormality alarm to visually or audibly inform an abnormality in the cell balancing circuit when there is the abnormality in the cell balancing circuit.

11. An apparatus for diagnosing an abnormality in a cell balancing circuit, the apparatus comprising:
a floating capacitor charged with voltage of a battery cell;
a cell balancing circuit connected to the battery cell for balancing the voltage of the battery cell and discharging the floating capacitor;
a voltage measuring unit for measuring a residual voltage of the discharged floating capacitor; and
a control unit for determining an abnormality in the cell balancing circuit based on the residual voltage of the discharged floating capacitor.

12. The apparatus for diagnosing an abnormality in a cell balancing circuit according to claim 11,
wherein the control unit determines that there is an abnormality in the cell balancing circuit when the residual voltage of the discharged floating capacitor exceeds a preset reference voltage.

13. The apparatus for diagnosing an abnormality in a cell balancing circuit according to claim 11,
wherein the voltage measuring unit further measures the battery cell voltage of the charged floating capacitor, and
wherein the control unit determines that there is an abnormality in the cell balancing circuit when a voltage difference between the battery cell voltage of the charged floating capacitor and the residual voltage of the discharged floating capacitor is less than a preset reference voltage.

14. A method for diagnosing an abnormality in a cell balancing circuit, the method comprising:
charging a floating capacitor with voltage of a battery cell;
measuring the battery cell voltage of the charged floating capacitor through a voltage measuring unit;
discharging the floating capacitor using a cell balancing circuit;
measuring a residual voltage of the discharged floating capacitor through the voltage measuring unit; and
determining an abnormality in the cell balancing circuit based on the residual voltage of the discharged floating capacitor.

15. The method for diagnosing an abnormality in a cell balancing circuit according to claim 14,
wherein the battery cell is plural, and
wherein the steps are simultaneously or sequentially performed on the plurality of battery cells.

16. The method for diagnosing an abnormality in a cell balancing circuit according to claim 14, further comprising:
controlling the operation of a first switch, a second switch, and a third switch;
converting an analog voltage signal outputted from the voltage measuring unit into a digital voltage signal; and
receiving the digital voltage signal and determining an abnormality in the cell balancing circuit based on the residual voltage of the discharged floating capacitor,
the first switch for establishing a connection between the floating capacitor and the battery cell or for releasing the connection;
the second switch for establishing a connection between the floating capacitor and the voltage measuring unit or for releasing the connection; and
the third switch for starting or ending the discharging of the cell balancing circuit.

17. The method for diagnosing an abnormality in a cell balancing circuit according to claim 14,
wherein the determining of an abnormality in the cell balancing circuit comprises determining that there is an abnormality in the cell balancing circuit when the residual voltage the discharged floating capacitor exceeds a preset reference voltage.

18. The method for diagnosing an abnormality in a cell balancing circuit according to claim 14,
wherein the determining of an abnormality in the cell balancing circuit comprises determining that there is an abnormality in the cell balancing circuit when a voltage difference between the battery cell voltage of the charged floating capacitor and the residual voltage of the discharged floating capacitor is less than a preset reference voltage.

19. The method for diagnosing an abnormality in a cell balancing circuit according to claim 14, further comprising:
visually or audibly informing an abnormality in the cell balancing circuit when there is the abnormality in the cell balancing circuit.

* * * * *